3,086,061
PROCESS FOR THE MANUFACTURE OF 2,6-DI-
  METHYLOL-3,5-DIMETHYL-4-CHLOROPHENOL
Harold P. Roberts, Tallmadge, Ohio, assignor to The
  Goodyear Tire & Rubber Company, Akron, Ohio, a
  corporation of Ohio
No Drawing. Filed Nov. 12, 1959, Ser. No. 852,222
                    3 Claims. (Cl. 260—623)

This invention relates to an improved process for the manufacture of 2,6 - dimethylol - 3,5 -dimethyl - 4-chlorophenol and more particularly to an improved method of recovering 2,6-dimethylol-3,5-dimethyl-4-chlorophenol from the reaction medium.

In the production of 2,6-dimethylol-3,5-dimethyl-4-chlorophenol considerable product has been lost during the recovery steps involving precipitation by neutralization and filtration of the neutralized precipitate when the alkaline reaction product containing the 2,6-dimethylol-3,5-dimethyl-4-chlorophenol was neutralized by adding cold acid to the cooled reaction product because the precipitate was difficult to filter and losses of product were observed up to as high as 15%.

It has now been discovered that an overall yield of at least 95% of theoretical can be obtained in accordance with the present invention in a more facile, efficient, and economical manner by adding the alkaline reaction mixture while in a heated condition, e.g. above 21° C., and preferably as received from the reaction vessel, e.g. at a temperature of about 50° C., to a warm neutralizing solution and then filtering the resulting precipitate. The neutralizing solution may be an acid medium such as sulfuric acid, hydrochloric acid and the like warmed to a temperature above 21° C. and preferably warmed to about the temperature of the reaction mixture to be neutralized.

The following example demonstrates the manner in which the present invention may be achieved:

*Example*

A solution of 4-chloro-3,5-xylenol was made by first forming a dilute solution of sodium hydroxide using 360 milliliters of water and 40 grams of a 50% sodium hydroxide solution and then adding 156.5 grams of the 4-chloro-3,5-xylenol and warming the mixture to 50° C. To this warmed mixture 170 grams of a 37% formaldehyde solution was added at a moderately rapid rate with stirring. The addition of the formaldehyde takes about 8 minutes. At first a clear solution develops and then after a short period of time a heavy precipitate develops which then thins out upon continued stirring at which time the temperature drops slightly followed by a slow rise in temperature. The temperature is then maintained at about 50° C. throughout the reaction. After 2 hours the reaction is complete and the mixture is poured with vigorous stirring into a solution of 225 milliliters of 10% sulfuric acid in an equal volume of water brought to 40° C., being careful near the end of the addition of the alkaline solution of the sodium salt not to over-run the end point. The resulting precipitate is then filtered and washed with water. The wet filter cake is then dried at 100° C. The yield of the product was 95% of theoretical being a soft white powder having a melting point of 153° C. to 154° C.

The product is useful as a stiffening agent when blended with rubber-like polymers such as butyl rubber, rubbery copolymers of styrene and butadiene, polybutadiene, and natural rubber.

While certain representative embodiments and details have been shown for the purpose of illustrating the invention, it will be apparent to those skilled in this art that various changes and modifications may be made therein without departing from the spirit or scope of the invention.

What is claimed is:

1. In the process of preparing 2,6-dimethylol-3,5-dimethyl-4-chlorophenol wherein 4-chloro-3,5-xylenol is reacted with formaldehyde in the presence of an aqueous alkaline solution of a sodium salt to produce the corresponding 2,6-dimethylol derivative, the improvement of adding the aqueous alkaline solution of the 2,6-dimethylol derivative while at a temperature between about 21° C. and about 50° C. to about a 10% aqueous hydrochloric acid medium to cause precipitation of said derivative and recovering said precipitated derivative.

2. In the process of preparing 2,6-dimethylol-3,5-dimethyl-4-chlorophenol wherein 4-chloro-3,5-xylenol is reacted with formaldehyde in the presence of an aqueous alkaline solution of a sodium salt to produce the corresponding 2,6-dimethylol derivative, the improvement of adding the aqueous alkaline solution of the 2,6-dimethylol derivative while at a temperature from about 21° C. to about 50° C. to aqueous medium containing sufficient acid to neutralize said solution up to and including the end point at a temperature from about 21° C. to about 50° C. to cause precipitation of said derivative and recovering said precipitated derivative.

3. In the process of preparing 2,6-dimethylol-3,5-dimethyl-4-chlorophenol wherein 4-chloro-3,5-xylenol is reacted with formaldehyde in the presence of an aqueous alkaline solution of a sodium salt to produce the corresponding 2,6-dimethylol derivative, the improvement of adding the aqueous solution of the 2,6-dimethylol derivative while at a temperature from about 21° C. to about 50° C. to about a 10% aqueous hydrochloric acid medium at a temperature from about 21° C. to about 50° C. to cause precipitation of said derivative and recovering said precipitated derivative.

References Cited in the file of this patent

Finn et al.: J. Applied Chem., vol. 1 (1951), 524–26, 260–621 (K) (3 pages).

Martin: Jour. Amer. Chem. Soc., vol. 73 (1951), 3952–54, 260–621 (K) (3 pages).

(Copies in Pat. Off. Sci. Library.)

UNITED STATES PATENT OFFICE
CERTIFICATE OF CORRECTION

Patent No. 3,086,061                              April 16, 1963

Harold P. Roberts

It is hereby certified that error appears in the above numbered patent requiring correction and that the said Letters Patent should read as corrected below.

Column 2, line 4, after "washed" insert -- thoroughly --; line 46, after "aqueous" insert -- alkaline --.

Signed and sealed this 12th day of November 1963.

(SEAL)
Attest:

ERNEST W. SWIDER

Attesting Officer

EDWIN L. REYNOLDS

Acting Commissioner of Patents